United States Patent [19]

Stanelle et al.

[11] Patent Number: 5,190,132
[45] Date of Patent: Mar. 2, 1993

[54] SYSTEM FOR LOADING A SILO VEHICLE OR SIMILAR WITH POURABLE BULK MATERIAL

[75] Inventors: Ambros Stanelle; Andric Stanelle, both of Guglingen, Fed. Rep. of Germany

[73] Assignee: Karl-Heinz Stanelle, Guglingen, Fed. Rep. of Germany

[21] Appl. No.: 458,723

[22] PCT Filed: Aug. 17, 1988

[86] PCT No.: PCT/EP88/00731
§ 371 Date: Mar. 15, 1990
§ 102(e) Date: Mar. 15, 1990

[87] PCT Pub. No.: WO89/01453
PCT Pub. Date: Feb. 23, 1989

[30] Foreign Application Priority Data

Aug. 19, 1987 [DE] Fed. Rep. of Germany ....... 3727561

[51] Int. Cl.$^5$ .............................................. B65G 11/14
[52] U.S. Cl. ..................................... 193/30; 193/25 E
[58] Field of Search ................. 193/30, 6, 25 R, 25 E, 193/25 C, 15; 414/140.5, 141.8, 143.1, 299, 397, 328, 329

[56] References Cited

U.S. PATENT DOCUMENTS

| | | | |
|---|---|---|---|
| 3,428,156 | 2/1969 | Charyn et al. | 193/30 |
| 4,225,033 | 9/1980 | Fukagai et al. | 193/30 X |
| 4,727,913 | 3/1988 | Bliss | 193/25 C X |

FOREIGN PATENT DOCUMENTS

| | | | |
|---|---|---|---|
| 1098849 | 4/1981 | Canada | 193/30 |
| 0051170 | 4/1979 | Japan | 193/30 |

Primary Examiner—Robert P. Olszewski
Assistant Examiner—Cheryl L. Gastineau
Attorney, Agent, or Firm—Collard & Roe

[57] ABSTRACT

The system has a closure element at the lower end of a set-down cone to close the lower end of a gravity chute and a device with at least a first traction element at various distances from the lower edge of the gravity chute. The system possesses a high loading capacity and high abrasion resistance, because at least the lowest hopper has an approximately rectangular cross-section in the plane normal to the longitudinal direction of the gravity chute. The first traction element is located along a straight line in the delivery channel and is attached to the closure element in such a way that it can be guided in the open space delimited by the set-down cone and the lowest hopper.

11 Claims, 3 Drawing Sheets

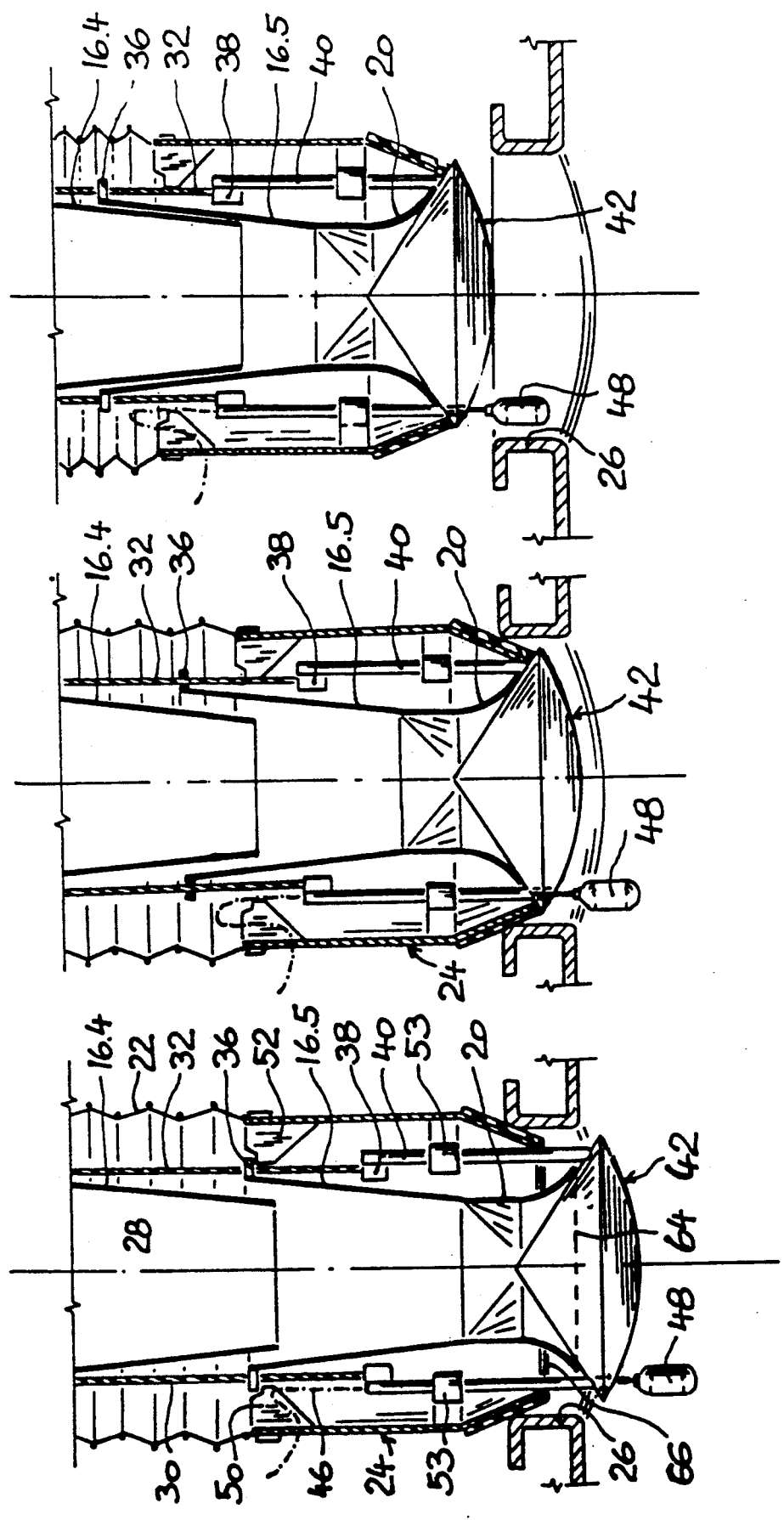

SYSTEM FOR LOADING A SILO VEHICLE OR SIMILAR WITH POURABLE BULK MATERIAL

TECHNICAL FIELD

The invention relates to a device for loading a silo vehicle or similar with pourable bulk material.

Loading devices of this type are used for the dustfree vertical filling of bulk materials in powder or grit form such as cement, lime, gypsum, finishing plaster, basalt, granules and similar, at times extremely abrasive, bulk materials into silo vehicles, railway In order to load a silo vehicle using such a loading device, the same is moved downwards so far that the set-down cone of the loading device sits on the dome of the silo vehicle. The close contact between the set-down cone and the dome of the silo vehicle makes possible a perfect dust seal during the loading process.

The dust/air mixture, which is displaced in the silo vehicle by the filling with solid matter, is extracted by means of the offtake channel provided in the loading device.

PRIOR ART

A first type of loading device has an internal tube which forms the actual loading tube and is concentrically surrounded by an external tube Both tubes can be contracted or extended in the manner of a concertina. The area between the internal tube and the external tube serves for the offtake of the dust/air mixture which is displaced during the loading process from the container to be filled The lower end of this twin-tube loading device can, when not in use, be closed by means of a closing part which can be applied to the underside of the loading device from below so as to be dustproof. By means of lifting the closing part, which is applied to the underside, to a greater or lesser extent, the closing part and thus also the two twin tubes can be lifted upwards to the corresponding extent. By means of lowering of the closing part, on the other hand, the twin tubes pull apart so that the external tube can be set down in a dustproof manner on the dome of a silo vehicle or similar.

The lifting and lowering of the closing part is carried out by means of a rope system which is arranged between the external tube and the internal tube. The rope system is thus not on the inside of the internal tube and therefore not in the bulk material flow. The influx of the bulk material can consequently not be affected which is very advantageous in terms of loading capacity. A major disadvantage of this loading device, however, is the presence of the internal tube, as this, in particular with very abrasive bulk materials, is exposed to heavy wear. Experience has shown that the internal tube has to be replaced disproportionately frequently, which not only leads to costs arising directly in connection with the replacement of this internal tube but additionally also leads to disruptions of the loading operation. Twin-tube loaders have therefore not gained acceptance on the market in those cases in which different bulk materials with varying abrasiveness are to be expected A loading device is known from EP-A-73,349 in which the "loading tube" consists of several wear-resistant funnels which are distributed over the height of fall and in each case taper downwards in the longitudinal direction of the chute. The known funnels have the shape of a hollow truncated cone with circular basal surface areas. The respective upper funnel sits with its lower end to a greater or lesser extent inside the upper area of the respective lower funnel, as a result of which the construction height of the loading device differs. In order that the loading capacity be as great as possible, the internal diameter of the funnels is selected so as to be as large as possible. As, moreover, the inclination of the lateral walls of each funnel must not be too steep, in order to avoid wedging of funnels inserted one inside another, in all the funnels on the market a funnel shape has emerged in which the respective upper opening edge has a larger diameter than the lower opening edge of the set-down cone which is to be closed by a closing part. This means that the pulling devices for the closing part can no longer be guided through in a straight line between the funnels and the concertina wall, which surrounds them concentrically on the outside, without inconvenient deflection devices The closing part of such a loading device, which has funnels which in each case taper downwards, is thus fastened to a rope which is provided centrally within the loading device and thus centrally in the chute, inside the buckets This rope is as a result, however, exposed to the bulk material flow and consequently undergoes heavy wear. As, in the upper area of the loading device, this rope must be guided at a right angle out of the bulk material flow and thus out of the chute, in order that the closing part can be lifted or lowered by means of a motor or manually, this deflection roller also is exposed to the bulk material flow and thus heavy wear. It has emerged moreover that, as a result of bulk material particles adhering to the deflection roller, the functional capability of the latter is affected This also leads to undesirable inconveniences during the operation of such loading devices.

DESCRIPTION OF THE INVENTION

The object of the invention is to indicate a device for loading a silo vehicle or similar with pourable bulk material, which device is equipped with a closing device and does not have the above-mentioned disadvantages and thus permits as high a loading capacity as possible.

Starting from the device known from EP-A-73,349 for loading a silo vehicle or similar with pourable bulk material, this object according to the invention is achieved by the features of the main claim. This accordingly known device is equipped with a chute for the bulk material which chute has several funnels which are distributed over the height of the fall and in each case taper downwards in the longitudinal direction of the chute. Furthermore, the device has an offtake channel provided outside the chute for the offtake of the bulk material/air mixture which escapes upon filling and a set down cone for the dustproof setting down of the device on the circular filling opening of the silo vehicle, which forms the outer, lower covering of the offtake channel. A closing part at the lower end of the set-down cone serves for closing the lower end of the chute and is held by a device which comprises at least one first pull member at varying distances from the lower edge of the chute. Accordingly, in such a loading device, the invention is characterized in that at least the lowest funnel is approximately rectangular in its cross-sectional planes which are normal to the longitudinal direction of the chute, that at least one side of the funnel intersects in outline in the manner of a chord the circular arc of the set-down cone, which arc delimits the opening of the loading device, and that the first pull member is provided along a straight line in the offtake channel and is fastened to the closing part in such a manner that it can be guided in the free space delimited between this chord and the circular arc of the set-down cone.

In this intermediate space left between this chord and the circular arc of the set-down cone, there is thus room to guide through the pull device to which the closing part, which closes the loading device from below, is fastened. The pull device therefore does not need to be inside the chute and thus exposed to the bulk material flow. This has positive effects on the service life of the pull device and moreover on the functional capacity of the closing part. Furthermore, with the loading device according to the invention, it is also possible to return to the funnel system which is particularly suitable for abrasive bulk materials. The loading capacity is also optimally high, as there is no pull rope or similar in the chute to reduce the cross-section and brake the rate of fall of the bulk material. The possibility afforded with the loading device according to the invention of removing the pull device for the closing part to the outside of the funnel has led to an increase in loading capacity of approximately 10% in comparison with comparable funnel loaders.

It has proved advantageous to align the pull member, which is provided in the offtake channel to hold the closing part, parallel to the longitudinal direction of the chute. A minimum expenditure of force is thus necessary to lift the closing part.

In order to ensure that the closing part can be applied centrally on the set-down cone from below and can thus close the latter, a guide is provided on the outside of the lowest funnel, in which guide the pull device for the closing part is height-adjustable in such a manner that the closing part can be positioned in a tip-resistant and twist-resistant manner at varying distances from the lower edge of the set-down cone.

This tip-resistant and twist-resistant guide for the closing part can in this connection be advantageously brought about with a rigid pull member for the closing part. In particular, the pull member provided to hold the closing part has in this connection in its lower area two rigid rod-shaped members and in its adjacent upper area two pull ropes, one pull rope in each case being fastened to one rod-shaped member and each of the rod-shaped members being fastened to the closing part Additionally, each pull rope is at the same time held with its upper end in the upper area of the device in such a manner that it can be wound up or unwound, in order to be able to hold the closing part at varying heights.

According to a further feature of the invention, the funnels are held one below another and suspended one from another by at least two second pull members. In this connection, this second pull member is fastened to two opposite lateral walls of each funnel., there being provided in each case on the two remaining lateral walls of each funnel a guide in which in each case the pull member necessary for holding the closing part is height-adjustably held. Consequently the funnels are held in the vertical direction on the one hand towards the bottom by means of the closing part via the pull member holding the latter and, furthermore and independently thereof, via the second pull members, to which the funnels, suspended one above another, are connected. Even in the event of the failure of one of these two pull members, the funnels are prevented from falling in an uncontrolled manner.

A particularly advantageous development of the invention is characterized in that the chute is entirely and thus also in the area of the top casing formed from such funnels. The rectangular cross-sectional shape is thus also provided below a shut-off element which is provided directly above a loading device and arranged below a discharge hopper containing bulk material. Although there are also sliding elements of circular cross-section, such as for example a throttle valve with a pivoted flap which rotates about an axle provided transversely to the bulk material flow, rectangular cross-sectional surfaces of sliding valves, which close to a greater or lesser extent, are of themselves the most suitable from an operational point of view.

It was not possible to use such rectangular sliding valves in a trouble-free manner in loaders known from prior art which have a funnel chute of circular cross-section; as a result of the cross-sectional tapering of the chute from a rectangle in the area of the sliding valve to a circle surrounded by the rectangle below the sliding valve, bulk material particles were deposited in the four corners of the sliding valve, which particles in time formed such a solid deposit that the sliding valve could no longer be completely closed. This led to overflowing of the silo vehicle and thus of the entire loading device also.

In order to accommodate the control equipment for the operation of the loading device and thus also, for example, the drive device for the lifting or lowering of the pull members so as to be externally protected, a top casing, which accommodates the entire mechanics of the loading device, is advantageously provided in the area outside the uppermost funnel.

An optimum loading cross-section is achieved if the funnels provided in the loader, in particular the lowest funnel, is formed approximately square in its cross-sectional planes which are normal to the longitudinal direction of the chute In order to improve the flow of the bulk material from the loading device, it has proved particularly appropriate to arrange on the lower opening edge of the lowest funnel a collar member which widens downwards in the manner of a trumpet. In this collar part, the greatest cross-sectional diameter is smaller than the internal diameter of the lower opening of the closing cone at least by so much that in outline an intermediate space still remains between the lowest funnel and the closing cone, through which intermediate space the pull member, which holds the closing part, can be guided.

The device proves moreover to be particularly user-friendly in that a level meter is arranged on the bottom of the closing part. In this connection, it proves advantageous if the rigid rod-shaped member for holding the closing part is a tube, through the inside of which the power supply wire for this level indicator, which can work electronically, electromechanically or pneumatically, can be conducted.

Further embodiments and advantages of the invention are given in the features which are further indicated in the claims.

BRIEF DESCRIPTION OF THE DRAWING

The invention is described and explained in greater detail below with reference to the exemplary embodiment represented in the drawing. The features indicated in the description and the drawing can be applied individually of themselves or in any combination of more than one in other embodiments of the invention In the drawing FIG. 2 shows a cross-sectional representation through the lower part of the loading device according to FIG. 1, in which the closing part is lifted so high that it bears against the lowest funnel from below, FIG. 3 shows a representation according to FIG. 2, in which the closing part is lifted so high that it bears against the lower free edge of the set-down cone in a dustproof manner from below, FIG. 4 shows a representation according to FIG. 3, in which the closing part is lifted higher, however, so that the lowest funnel has been pushed over the funnel above and the loading device no longer sits on the silo vehicle

METHODS OF PERFORMING THE INVENTION

Figure 1:
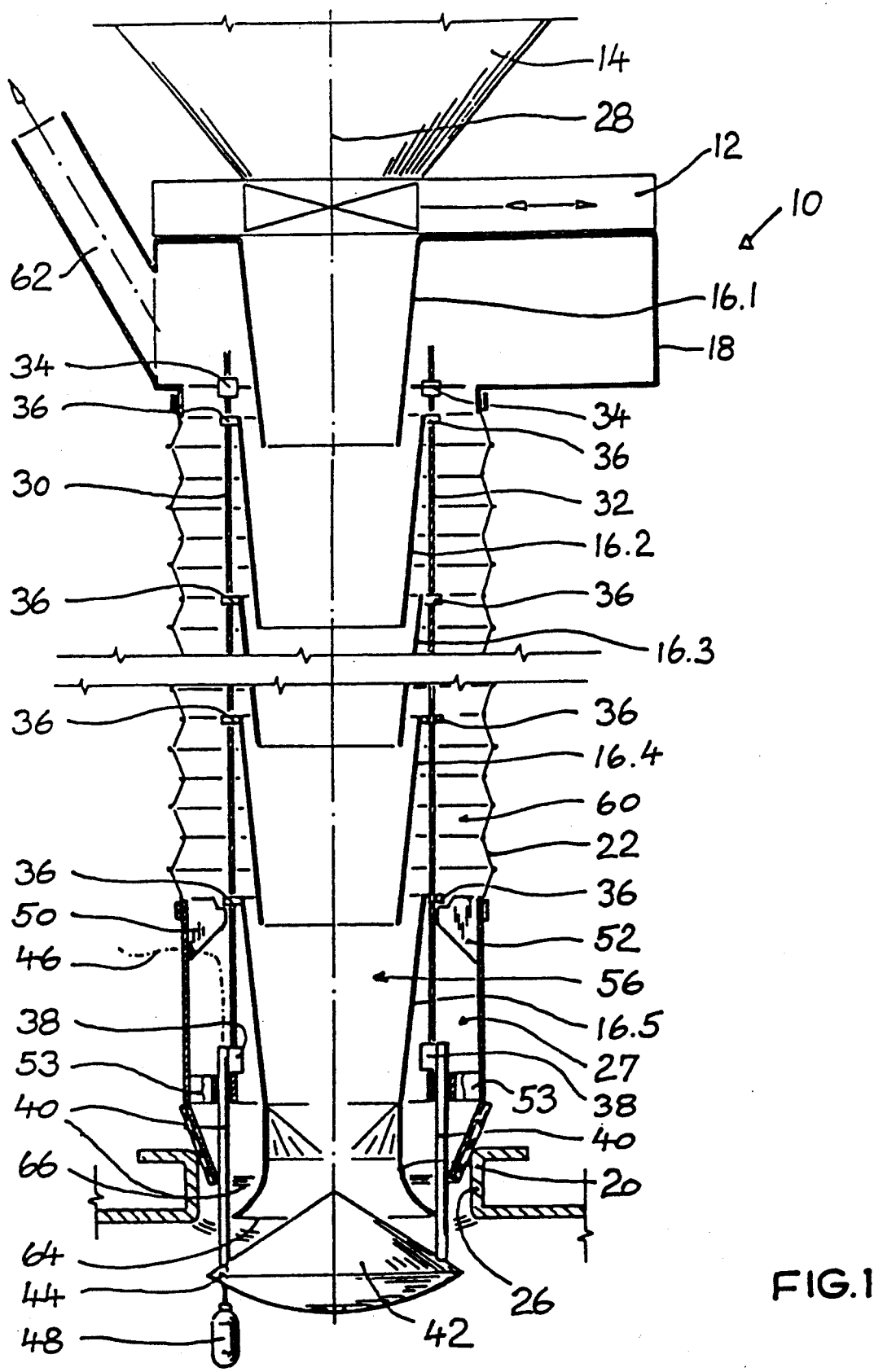
FIG. 1 shows a longitudinal cross-section through a loading device positioned on a silo vehicle.

A so-called loader 10, which represents a device for loading a silo vehicle or similar with pourable bulk material, is arranged below a sliding valve 12. This sliding valve 12 in turn is connected from below to the discharge hopper 14 of a silo container which is not represented in greater detail in the drawing.

The loader 10 has several funnels 16 (16.1, 16.2, 16.3, 16.4, 16.5) which have the shape of hollow, straight truncated pyramids with a square basal surface area. These funnels in each case taper towards the bottom and are partially inserted one inside another so that the lower in each case covers the funnel above it to a certain extent from the bottom up.

In the extended state of the loader 10, in which state the latter possesses its maximum length, the extent of covering between the individual funnels is at its smallest. In the upwardly contracted state of the loader 10, the funnels are inserted one inside another, as is shown with the two lowest funnels in the representation in FIG. 4 by way of comparison.

The uppermost funnel 16.1 is enclosed by a top casing 18 in which the entire control mechanics for the loader are arranged. The uppermost funnel 16.1 connects with its upper square opening to the sliding valve 12 from below. The maximum cross-sectional opening of the sliding valve 12 corresponds to the shape and size of the cross-section of the uppermost funnel in its uppermost cross-sectional area.

To the underside of the lowest funnel 16.5, a collar 20 is connected, which widens downwards in the manner of a trumpet. In the connection area between the collar 20 and the funnel 16.5, the latter has a square cross-section.

The funnels 16, below the top casing 18, are surrounded by a concertina wall 22 which surrounds the funnels concentrically on the outside. This concertina wall 22 is fastened with its upper end to the top casing 18. At the lower end of this concertina wall 22 a set-down cone 24 is fastened which in its upper area has the shape of a hollow circular cylinder and in its lower area that of a hollow circular cylindrical frustum. The set-down cone sits, with its part which converges conically at the bottom, on the dome 26 of a silo vehicle which is not shown in greater detail.

In the intermediate space 27 between the funnels 16 and the concertina wall 22 or the set-down cone 24 there are two rope pulls 30, 32 which lie opposite one another in relation to the longitudinal axis 28 of the system. Each rope pull 30, 32 ends in the top casing 18 where the rope can be wound u or unwound in a manner which is not shown in greater detail. In order to prevent the dust/air mixture, which is present in the area between the funnels 16 and the concertina wall 22, being able to penetrate into the top casing 18, each rope pull is guided through a packing box 34 into the top casing 18.

On the outside of the funnels 16 on each of the opposite sides of the same there is a loop 36 through which the rope pull 30 or 32 is guided.

The lower end of the rope pull 30, 32 ends in a stop 38 which is rigidly connected to a straight tube 40. This tube 40 projects downwards out of the loader 10 in the intermediate space between the funnel 16.5 and the set-down cone 24. At its lower end the tube 40 is connected rigidly in the external—in the drawing left or right—area of a closing part 42. In the area of the closing part 42 the internal hollow area of the tube 40 continues in a drill hole 44.

A cable 46, on the lower end of which a level indicator 48 is fastened, runs through the tube 40 and the drill hole 44. The upper end of this cable 46 penetrates the set-down cone 24 in its upper area and ends, in a manner which is not shown in greater detail, in the top casing 18 where the control elements are located which process accordingly the signals received from the sensor 48.

On the inside of the set-down cone 24, in its upper area, there is a stop plate 50, 52 which projects into the internal space and serves as the lower stop for the loop 36 of the funnel 16.5. In the representation according to FIG. 1, the lowest funnel 16.5 rests on the stop plates 50 or 52 by means of its loops 36 so that it cannot be lowered any further in relation to the set-down cone 24. The set-down cone 24 on the one hand rests on the dome 26 so that the rope pulls 30, 32 can then only be loaded by the weight of the closing part 42.

In the representation according to FIG. 1, the closing part 42 cannot be moved further downwards as the tube 40, with the stop 38 connected to it, rests on a mounting 53 which surrounds the tube 40 concentrically and also projects from the inside of the set-down cone 24 in he manner of a collar. In this state the rope pull 30, 32 is no longer loaded by the closing part 42 either. The tensile stress, which is no longer present in the pull rope 30, 32, can thus be used to control the sliding valve to the effect that the sliding valve 12 can now be opened to its maximum extent; that is to say the loader 10 is in a state in which the desired bulk material can flow through it. When the bulk material flows out through the chute 56 formed by the funnels, the dust/air mixture, which is at the same time displaced in the silo vehicle, is conducted off upwards through the loader 10 by means of the offtake channel 60, which is provided in the intermediate space 27 between the funnels and the concertina wall 22, and is led back into the silo container through an offtake pipe 62.

In the representation according to FIG. 2, the rope pulls 30, 32 are pulled up so far that the closing part 42 bears more or less tightly against the lower free edge 64 of the collar 20 from below The funnel 16.5 and the other funnels as well as the set-down cone 24 are still in their position as shown in FIG. 1; only the tubes 40, in accordance with the pulling movement on the rope pulls 30, 32, have been displaced upwards so that their stops 38 no longer rest on the mountings 50, 52 from above.

In the representation according to FIG. 3, the closing part 42 bears against the lower free edge 66 of the set-down cone 24 in a dustproof manner. The closing part 42 has adopted this position because the rope pulls 30, 32 and thus the tubes 40 have been raised upwards correspondingly. With the higher positioning of the closing part 42, in relation to FIG. 2, the lower funnel 16.5 has also been raised upwards to a corresponding extent with the latter. The funnel 16.4 above it has not changed its position in terms of height in either the representation according to FIG. 2 or in the representation according to FIG. 3.

In FIG. 4, the loader 10 is represented in a position in which it no longer rests on the dome 26 of the silo vehicle. The loader has adopted this position because the closing part 42, in relation to its position in FIG. 3, has been moved further upwards by means of the pull ropes 30, 32 and thus the tubes 40 also. With this further lifting movement, the lower funnel 16.5 has also been raised upwards to a corresponding extent. The funnel 16.4 above it has (still) not changed its position in terms of height As a result the lower funnel 16.5 has overlapped the upper funnel 16.4 to a corresponding extent from below.

By means of further upward pulling of the rope pulls 30, 32 and thus also of the closing part 42. the remaining funnels are inserted one inside another from the bottom up so that the set-down cone 24 of the loader 10 can be raised upwards to a corresponding extent.

Figure 5:
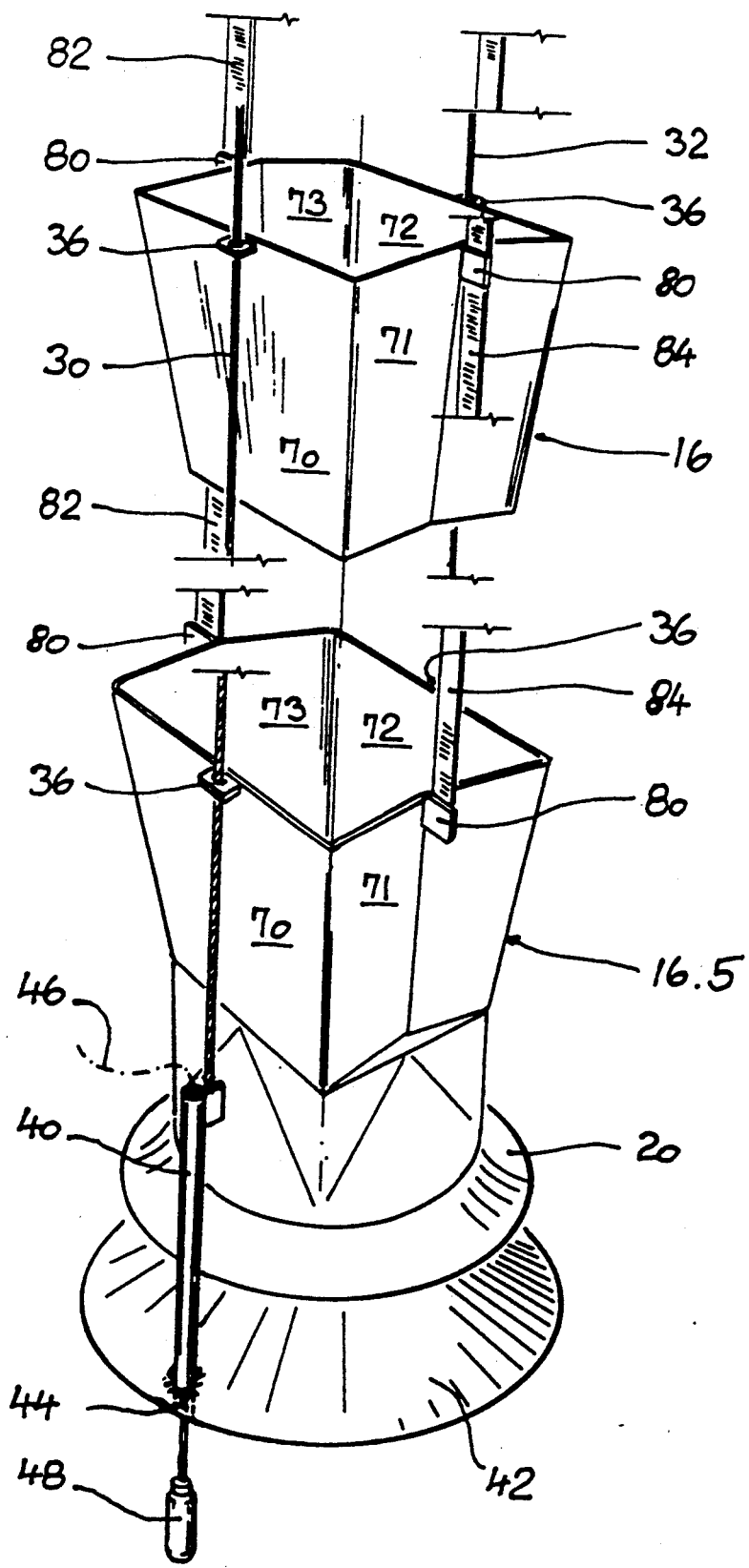
FIG. 5 shows a perspective representation of the closing part, the lowest funnel and an additional funnel as well as a level indicator.

In the representation according to FIG. 5, the closing part 42 can be seen, on which one of the tubes 40 is rigidly fastened The cable 26 runs from above through the tube and the drill hole 44 and ends in the indicator 48 which is located below the closing part 42. At the upper end of the tube 40, the same has the stop 38 in which the rope pull 30 or 32 is fastened. The rope pulls 30, 32 are held in their position by means of loops 36 which are in each case provided in the area of each funnel 16. These loops 36 are provided on two opposite sides 70, 72 of each funnel. On the two other sides 71, 73 of each funnel, mountings 80 are arranged. These mountings serve in each case for the fastening of a belt band 82, 84. On two opposite sides of each funnel there are thus the two rope pulls 30, 32 and on the two other opposite sides of each funnel the belt bands 82, 84.

Each funnel 16—including the lowest funnel 16.5 without the collar 20 provided thereon—consists of two, in each case trapezoidal, cuts which are correspondingly bent off and connected—for example by means of weld seams—to one another. The trapezoidal shape of the two cuts of each funnel means that the upper and lower edges of two opposite sides, in FIG. 5 of sides 71, 73, are formed in the manner of a gabled roof. As all corresponding upper and lower edges of the funnels have this shape, the effect of this gabled roof execution is not inconvenient Consequently a waste-free possibility is afforded for the manufacture of funnels with a square cross-section which taper upwards.

We claim:

1. A device for loading a silo vehicle having a circular filling opening with pourable bulk material comprising:
    a chute for the bulk material, which chute has several funnels which are distributed over the height of fall and in each case taper downwards in the longitudinal direction of the chute;
    an offtake channel provided outside the chute for the offtake of the bulk material/air mixture which escapes upon filling;
    a set-down cone for the dustproof setting down of the device on the circular filling opening of the silo vehicle, which forms the outer lower covering of the offtake channel;
    a closing part at the lower end of the set-down cone for closing the lower end of the chute;
    a device which comprises at least one first pull member for holding the closing part at varying distances from the lower edge of the chute;
    at least the lowest funnel is approximately rectangular in its cross-sectional planes which are normal to the longitudinal direction of the chute;
    at least one side of the funnel intersects in outline in the manner of a chord the circular arc of the set-down cone which arc delimits the opening of the loading device; and
    the first pull member is provided along a straight line in the offtake channel and is fastened to the closing part in such a manner that it can be guided in the free space delimited between this chord and the circular arc of the set-down cone.

2. A device according to claim 1, wherein the first pull member is provided parallel to the longitudinal direction of the chute.

3. A device according to claim 1, further comprising a guide provided on the outside of the lowest funnel, in which guide the first pull member is height-adjustable in such a manner that the closing part can be positioned in a tip-resistant and twist-resistant manner at varying distances from the lower edge of the set-down cone.

4. A device according to claim 1, wherein the first pull member is itself formed rigidly in the area of at lest the lowest funnel.

5. A device according to claim 4, wherein the first pull member has in its lower area two rigid rod-shaped members and in its adjacent upper area two pull ropes, one pull rope in each case being fastened to one rod-shaped member and each of the rod-shaped members being fastened to the closing part, and each pull rope being at the same time held with its upper end in the upper area of the device in such a manner that it can be wound up or unwound.

6. A device according to claim 1, wherein the funnels are held one below another and suspended one from another by at least two second pull members;
    in each case a second pull member is fastened to two opposite lateral walls of each funnel; and
    in each case on the two remaining lateral walls of each funnel a guide is provided, in which in each case a first pull member is height-adjustably held.

7. A device according to claim 1, wherein the chute is entirely formed, even in the area of the top casing, from funnels which are rectangular in cross-section, the upper edge of the filling opening of the loading device being formed by the upper free edge of the uppermost funnel.

8. A device according to claim 7, further comprising a top casing, which accommodates the entire mechanics of the loading device, is provided in the area outside the uppermost funnel.

9. A device according to claim 1, wherein at least the lowest funnel is formed approximately square in its cross-sectional planes which are normal to the longitudinal direction of the chute.

10. A device according to claim 1, wherein on the lower opening edge of the lowest funnel, a collar part which widens downwards in the manner of a trumpet is arranged, the greatest cross-sectional diameter of this collar part being smaller than the internal diameter of the lower opening of the closing cone at lest by so much that in outline an intermediate space still remains between the lowest funnel and the closing cone, through which intermediate space the pull member, which holds the closing part, can be guided.

11. A device according to claim 5, wherein the rigid rod-shaped member is a tube, through the inside of which the power supply wire for a level indicator, which is provided on the closing part, can be conducted.

* * * * *